United States Patent
Osborn et al.

(10) Patent No.: US 9,752,655 B2
(45) Date of Patent: Sep. 5, 2017

(54) TRANSMISSION

(71) Applicant: JAGUAR LAND ROVER LIMITED, Warwickshire (GB)

(72) Inventors: Russell Osborn, Coventry (GB); Alex Tylee-Birdsall, Coventry (GB); John Spooner, Coventry (GB); Steve Mullane, Coventry (GB); Steve Nesbitt, Coventry (GB); Gareth Thomas, Coventry (GB); Matthew Hole, Coventry (GB); Mark Findlay, Coventry (GB); George Scott, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 128 days.

(21) Appl. No.: 14/787,823

(22) PCT Filed: Apr. 17, 2014

(86) PCT No.: PCT/EP2014/057925
§ 371 (c)(1),
(2) Date: Oct. 29, 2015

(87) PCT Pub. No.: WO2014/177396
PCT Pub. Date: Nov. 6, 2014

(65) Prior Publication Data
US 2016/0102734 A1    Apr. 14, 2016

(30) Foreign Application Priority Data
May 1, 2013 (GB) .................................. 1307852.2

(51) Int. Cl.
*F16H 3/08* (2006.01)
*F16H 3/093* (2006.01)
*B60K 17/346* (2006.01)

(52) U.S. Cl.
CPC ............ *F16H 3/093* (2013.01); *B60K 17/346* (2013.01); *F16H 2003/0807* (2013.01);
(Continued)

(58) Field of Classification Search
CPC ...................... F16H 37/021; F16H 2003/0931
(Continued)

(56) References Cited

U.S. PATENT DOCUMENTS 4,799,395 A * 1/1989 Janiszewski ........... B60K 17/26
192/219.2
8,033,194 B2 * 10/2011 Suzuki .................... F16H 3/093
74/331

(Continued)

FOREIGN PATENT DOCUMENTS

CN    201250883 Y    6/2009
CN    101571179 A    11/2009
(Continued)

OTHER PUBLICATIONS

International Search Report for International application No. PCT/EP2014/057925 dated Jul. 31, 2014.
(Continued)

*Primary Examiner* — Ha D Ho
(74) *Attorney, Agent, or Firm* — Carlson, Gaskey & Olds

(57) ABSTRACT

A constant mesh gearbox has five parallel rotational axes. The input and output axes are not aligned. Some torque paths are via a sleeve rotatable on a shaft on one of said axes. Up to eight forward speeds are disclosed, with two very low ratios suitable for non-highway travel. The transmission is suitable for two and four wheel drive.

15 Claims, 6 Drawing Sheets

(52) U.S. Cl.
CPC ......... *F16H 2003/0822* (2013.01); *F16H 2003/0826* (2013.01); *F16H 2003/0931* (2013.01); *F16H 2003/0933* (2013.01); *F16H 2200/006* (2013.01); *F16H 2200/0086* (2013.01)

(58) Field of Classification Search
USPC .................... 74/330, 331, 333, 340, 339
See application file for complete search history.

(56) References Cited

U.S. PATENT DOCUMENTS

| | | | | |
|---|---|---|---|---|
| 8,887,588 B2* | 11/2014 | Koyama | ............... | B60W 10/02 74/329 |
| 2006/0058147 A1* | 3/2006 | Sander | .................. | F16H 63/30 475/200 |
| 2006/0230854 A1 | 10/2006 | Enstrom et al. | | |
| 2011/0048149 A1* | 3/2011 | Nishimura | ............. | F16H 3/093 74/331 |

FOREIGN PATENT DOCUMENTS

| | | |
|---|---|---|
| EP | 1531286 A1 | 5/2005 |
| EP | 2068039 A1 | 6/2009 |
| JP | 2010-203605 A | 9/2010 |
| JP | 2011252558 A | 12/2011 |
| WO | 2011082743 A1 | 7/2011 |

OTHER PUBLICATIONS

Combined Search and Examination Report under Sections 17 and 18(3) for Application No. GB1307852.2 dated Oct. 25, 2013.
Patent Office of the People's Republic of China, First Search, CN Application No. 201480024530.8 dated Jan. 4, 2017.

* cited by examiner

TRANSMISSION

TECHNICAL FIELD

The present invention relates to a gear transmission and particularly, but not exclusively, to a transmission having a plurality of selectable speed ratios provided by respective pairs of gear wheels. Aspects of the invention relate to a gearbox, to a powertrain and to a vehicle.

BACKGROUND

Gear transmissions are typically used in motor vehicles, and multiple speed ratios allow the engine characteristics to be best matched to the required gradient launch, acceleration, top speed, fuel economy and other well understood factors. Gear pairs are typically in constant mesh, and are engaged and disengaged by synchromesh mechanisms which incorporate dog clutches. Manual selection of the required speed ratio is common, but some gear transmission variants have automated or assisted selection, or have fully automatic speed ratio selection.

In order to achieve good acceleration and fuel economy, the number of speed ratios have increased in recent years, and for some vehicles as many as eight or more forward speed ratios may be provided. Inevitably, these additional speed ratios tend to increase the size of the transmission, which is problematic for vehicle designers where the available space envelope is restricted. A particular difficulty with in-line transmission (so called North-South alignment) is of ingress into the passenger compartment.

Another objective of vehicle designers is to design components for a range of vehicles, so a substantially common base component is modified to suit the particular attributes which are required of each vehicle in the range. In one extreme example a common component, such as a vehicle transmission, may be required to serve in both a sports car and a vehicle having off-road capability. The base component may be simple and have features added thereto, or it may be complex and have features deleted.

SUMMARY OF THE INVENTION

According to an aspect of the present invention there is provided a constant mesh gearbox having a plurality of individually selectable forward speed ratios, and comprising a casing (20) defining an array of parallel rotational axes (31-35), said axes including an input axis (31), an output axis (35) and a plurality of intermediate axes (32-34), and gear pairs for driving between members rotatable on the input axis, the output axis and said intermediate axes, wherein a first shaft (12) is rotatable on one of said intermediate axes, a second shaft (14) is rotatable on another of said intermediate axes, said first and second shaft are directly connected by a first gear wheel pair (60, 80), a sleeve (74) is rotatable on said second shaft (14), and said sleeve and said first shaft are directly connected by a second gear wheel pair (75, 76), and wherein said sleeve (74) supports a first gear wheel (77) for rotation thereon, said first gear wheel (77) being selectively connectable for rotation with said sleeve, and being in driving engagement with an input shaft (11) on said input axis (31).

In an alternative there may be provided a constant mesh gearbox having a plurality of individually selectable speed ratios, and comprising a casing defining five parallel rotational axes, said axes being respectively an input axis, an output axis and three intermediate axes, and gear pairs for driving between members rotatable on the input axis, the output axis and the intermediate axes.

The gearbox of the invention may be characterized as being wide and short. A feature of embodiments of the invention is that the input and output axes are not aligned which, in the case of an in-line transmission allows an output axis lower than the crankshaft centre line of the engine; this in turn allows a low floor in the passenger compartment with a comparatively negligible transmission tunnel.

Embodiments of the invention provide six, seven and eight sequential speed ratios in one direction, and one or two sequential speed ratios in the other direction of rotation. The forward speed ratios are at acceptable steps, in the range 60-75% of the preceding speed ratio, and thus give an appropriate 'feel' to the vehicle driver, in use.

A feature of an embodiment of the inventive transmission is that the six highest speed ratios comprise respective pairs of gear wheels which may be adjusted in diameter to obtain a desired variation in the ratio step from one speed to another.

In use, one or two speed ratios may be omitted if not required in the vehicle for which the transmission is intended; thus may allow omission of gear wheels and gear selection components if not required for other speed ratios.

In embodiments of the invention one or two speed ratios may be described as low, and intended for use at low vehicle speeds. By selecting a suitable final drive ratio in a vehicle axle, these low ratios may be suitable for an off-road vehicle.

An embodiment of the invention provides a transmission in which the higher ratios generally have fewer gear wheels in the gear transmission train than the lower ratios, and thus less risk of gear noise at high vehicle speeds. Thus in an eight forward speed embodiment, the highest six ratios have fewer gear wheels in the transmission train than the lowest two ratios.

A feature of an embodiment of the invention is a sleeve rotatable on an intermediate shaft.

In one aspect there is provided a constant mesh gearbox having a plurality of individually selectable forward speed ratios, and comprising a casing defining an array of parallel rotational axes, said axes including an input axis, an output axis and a plurality of intermediate axes, and gear pairs for driving between members rotatable on the input axis, the output axis and said intermediate axes, wherein a first shaft is rotatable on one of said intermediate axes, a second shaft is rotatable on another of said intermediate axes, said first and second shaft are directly connected by a first gear wheel pair, a sleeve is rotatable on said second shaft, and said sleeve and said first shaft are directly connected by a second gear wheel pair.

The sleeve allows additional gearing options and torque flows within a short transmission.

Aspects of the gear wheel arrangements are enumerated in the claims appended hereto.

In an embodiment the sleeve is supported by rolling element bearings adjacent the ends thereof, one of said bearings engaging said casing, and the other of said bearings engaging said second shaft. The other of said bearings is in one embodiment disposed between the second shaft and the second gear wheel, the second gear wheel being journalled on the sleeve.

According to embodiments of the invention the input axis is not aligned with the output axis, thus permitting a relatively low level output (propeller) shaft for a rear wheel drive vehicle having a conventional north/south engine installation. Such a low level output shaft ensures minimum intrusion into the passenger space of the vehicle. In a front wheel drive vehicle with east/west engine installation, a low level output axis is convenient for drive to the front wheels whilst avoiding excessive angularity of drive shafts.

A differential gear on the output axis may be provided to give drive to opposite vehicle axles, typically front and rear axles. In one embodiment of the invention drive to one of said axles is on a sixth parallel axis radially outboard of said output axis. Means for driving between the output axis and the sixth axis may include gear wheels or a chain/belt and sprockets. This arrangement provides a low forward drive axis for the front axle of a vehicle, and facilitates passage of the usual propeller shaft past a front mounted engine.

There may be provided a transmission according to the invention having one or more very low ratios incorporated in a single transmission casing. By very low ratios we mean overall ratios lower than that encountered and vehicle designed solely for highway use, and typically as low as 20:1 and/or with a spread of forward ratios exceeding 15. Such ratios are typically provided by a selectable transfer box of a four wheel drive off-road vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings in which:—

DETAILED DESCRIPTION

Figure 1:
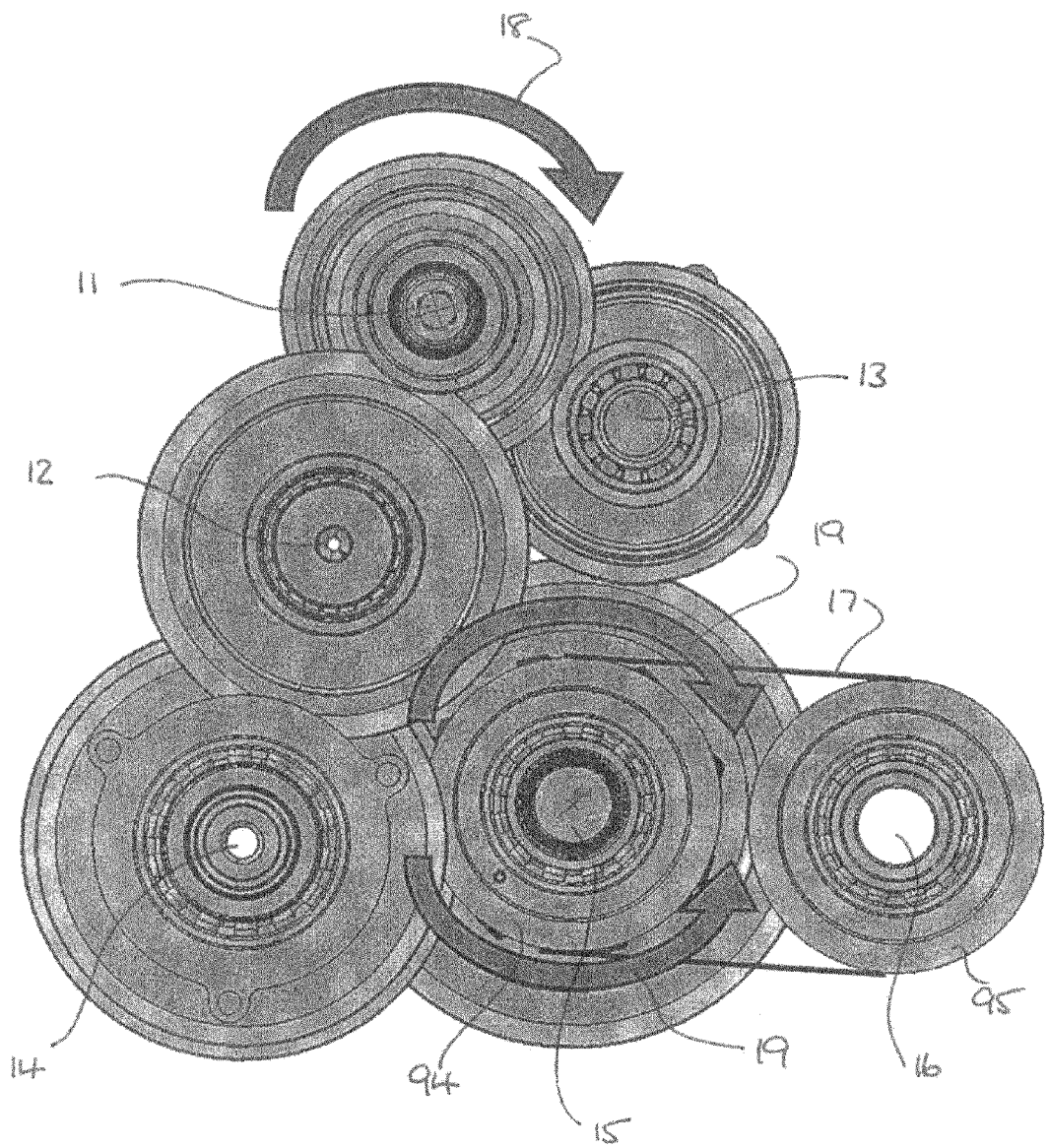
FIG. 1 is a schematic elevation of one axial end of a transmission according to an embodiment of the invention.
Figure 2:
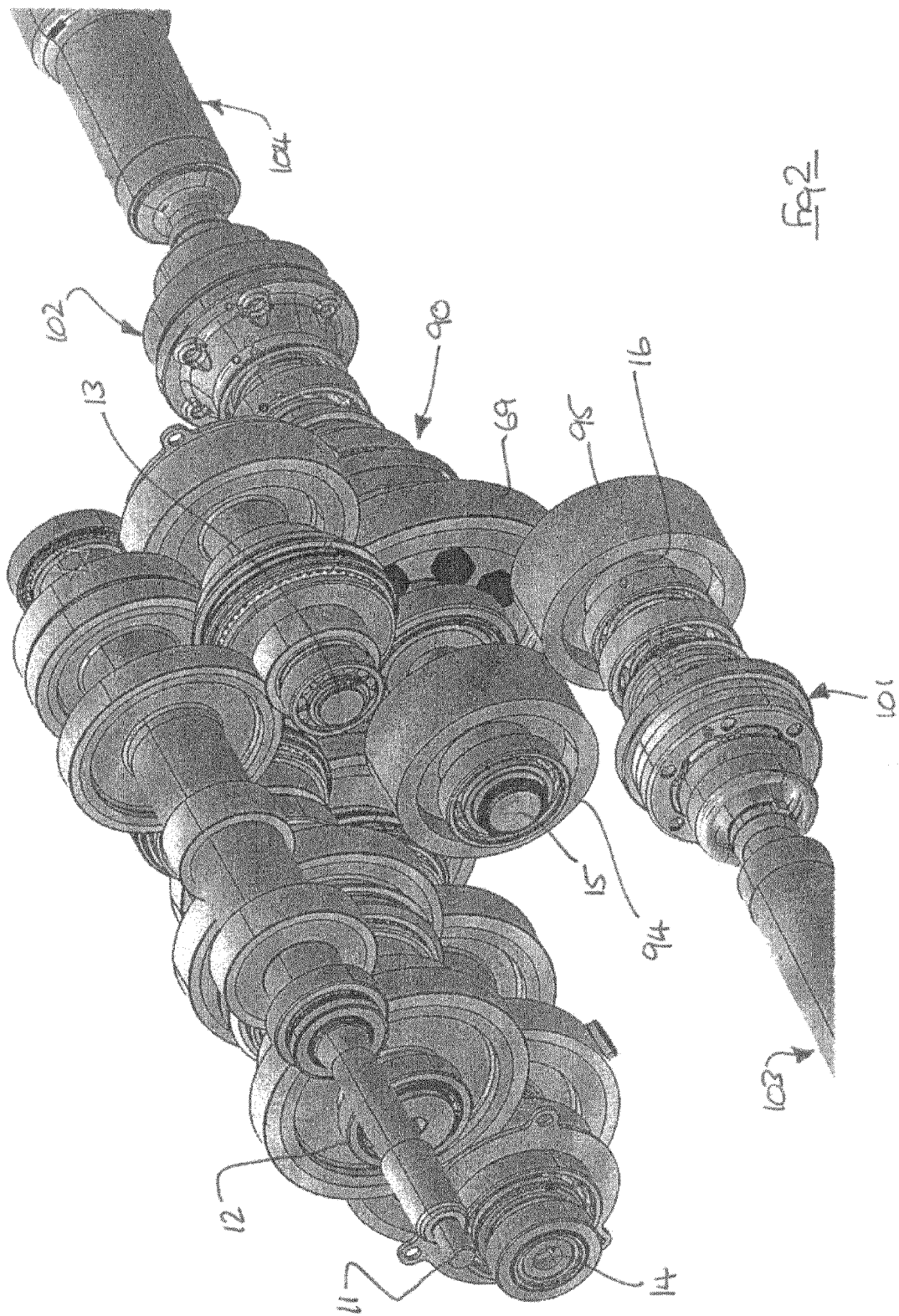
FIG. 2 illustrates a variant of the transmission of FIG. 1 from the side and one end.

A transmission according to an embodiment of the invention is illustrated in FIGS. 1-2, and comprises five shafts having parallel axes supported for rotation in a transmission casing (not shown). The shafts are identified as input shaft 11, low speed layshaft 12, high speed layshaft 13, reverse layshaft 14 and primary output shaft 15. A secondary output shaft 16 may optionally be provided on a sixth parallel axis, in particular where drive to two vehicle axles is required. Although termed 'primary' and 'secondary', the output shafts 15, 16 may be alone or in combination, and thus a drive connection from either may be omitted if a single driven axis is sufficient. Thus the transmission in a vehicle may provide front wheel drive, rear wheel drive and all wheel drive, in different configurations.

By 'high' and 'low' speed layshafts we mean that the shafts are associated with respective higher and lower speed ratios, not that the shafts necessarily have high and low speeds as such.

The shafts 11-15 support pairs of gear wheels in constant mesh, which may be engaged with and disengaged from respective shafts so as to provide drive through the transmission.

The number and form of teeth on each gear wheel is selected according to well understood parameters and forms no part of this invention as such. The relative diameter of respective pairs of gear wheels is selected to give appropriate speed ratios, and in particular acceptable steps between adjacent ratios, as will become apparent from the following description. Roller and ball bearings are provided to support the shafts within the transmission casing in accordance with well understood principles, and taking into account the torque to be transmitted, thrust loads, bearing life and other conventional factors.

As illustrated in FIG. 1 drive between primary and secondary output shafts 15, 16 is by chain or belt 17, in order to preserve a desired rotational direction. Arrow 18 represents the direction of input torque, whereas arrows 19 represent that output torque may be in either rotational direction (.e. both forward and reverse in a vehicle).

A feature of the transmission, which will be readily apparent from FIG. 1, is that the layshafts 12, 13 and the reverse shaft 14 can directly drive the primary output shaft 15.

Figure 3:
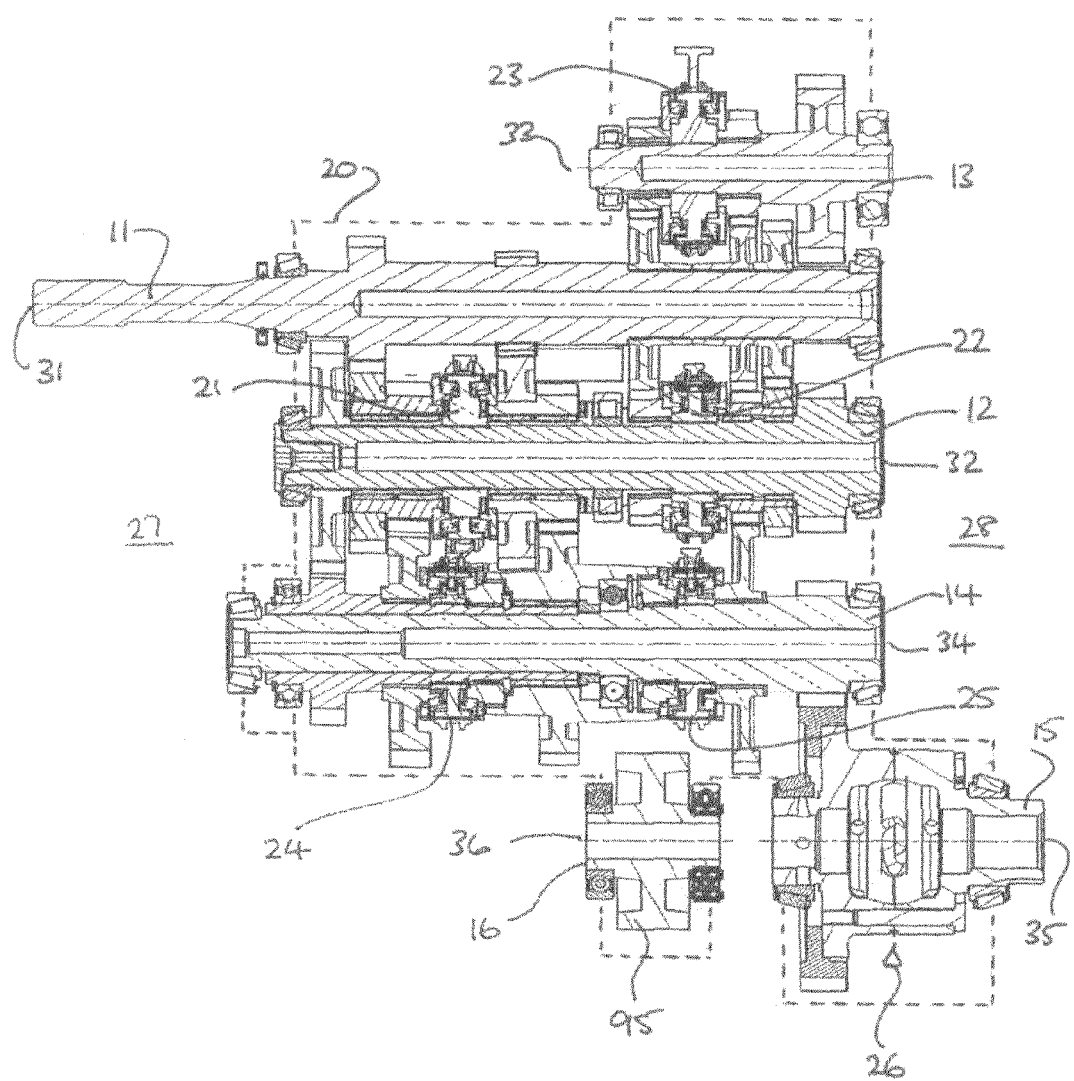
FIG. 3 is a developed section through the transmission of FIG. 2, showing all of the shaft axes in the same plane.

The disposition of shafts within the transmission casing is as illustrated in FIGS. 1 and 2. However for the purposes of further explanation, FIG. 3 shows a developed longitudinal section, with all shafts in a common plane. A casing is represented by dotted line 20 in order to show support for respective shaft bearings.

The main features of the transmission of FIG. 3 are as follows:

selectable gear pairs are provided between the shafts in four planes;

a fifth plane is defined at the left side (as viewed) for gear wheels which couple the layshafts 12 and 14; and a sixth plane is defined at the right side (as viewed) for gear wheels which directly drive the output shaft 15;

five pairs of double acting gear selectors 21-25 are provided, each consisting of dog clutches which typically incorporate conventional synchromesh couplings;

an all wheel drive variant is illustrated—thus both output shafts 15, 16 are included, and the primary output shaft 15 includes a differential gear 26 within the transmission casing (the centre differential of a vehicle);

the low speed layshaft 12 defines a torque path for the low speed ratios 1-4;

the high speed lay shaft 13 defines a torque path for the high speed ratios 5-6;

a somewhat conventional reverse ratio is provided via the reverse shaft 14, in order to reverse the direction of rotation of the output shaft 15;

two additional very low speed ratios, and one additional reverse ratio are provided, as will become apparent;

the shafts are arranged on parallel axes 31-36. It should be noted that axes 35, 36 are not co-axial in practice notwithstanding the depiction of FIG. 3.

Figure 4:
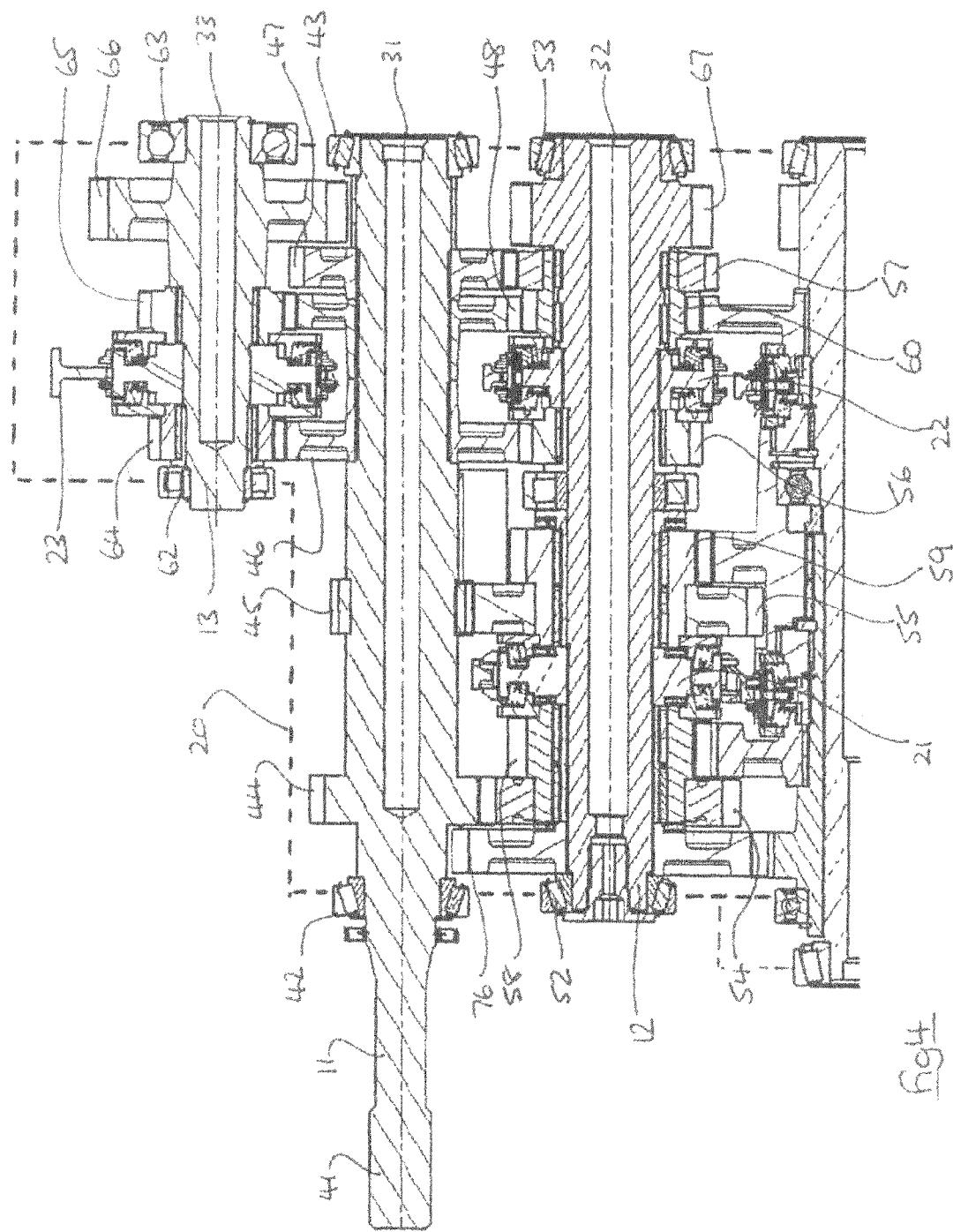
FIG. 4 is an enlarged view of the upper part of FIG. 3.
Figure 5:
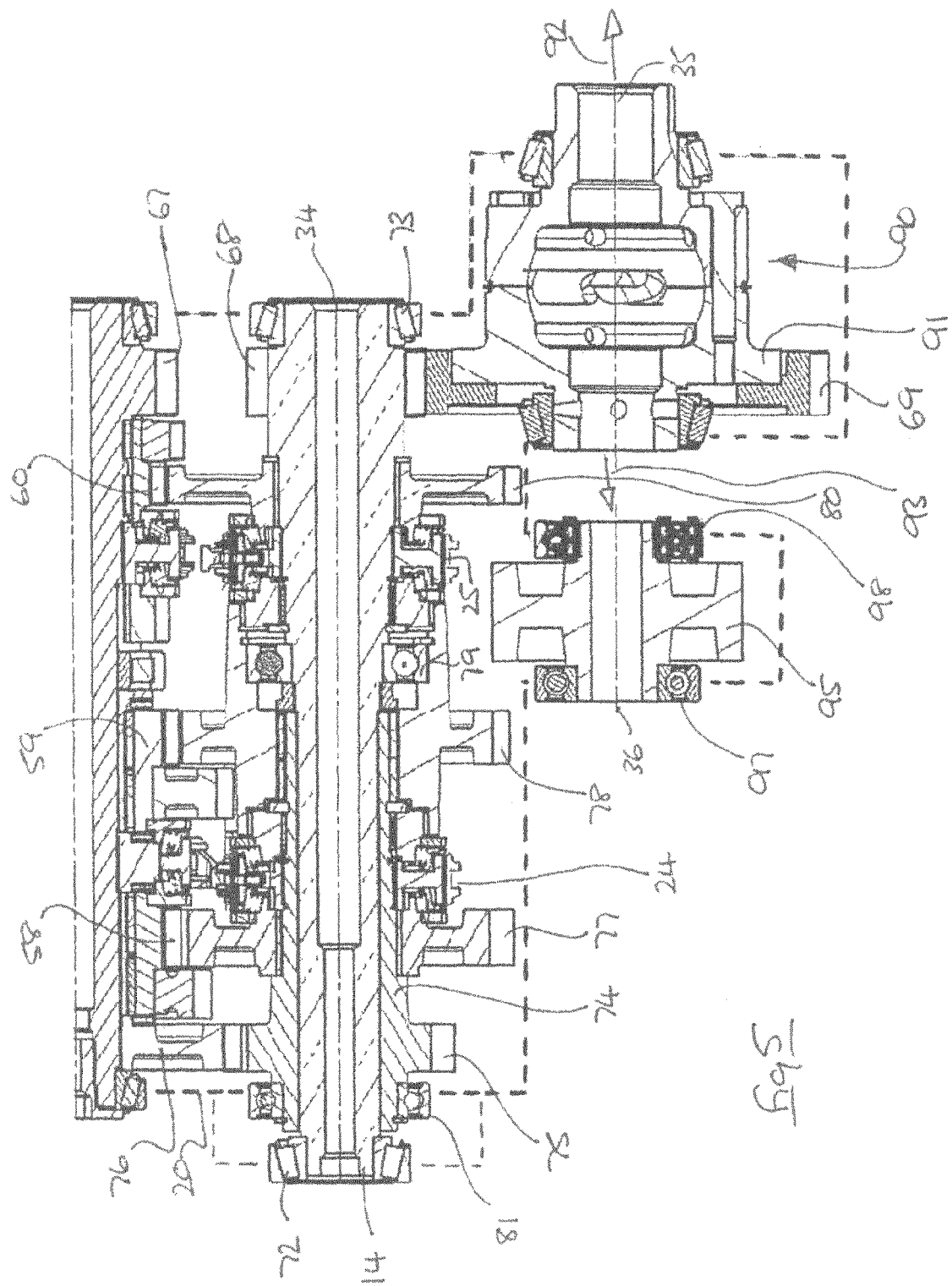
FIG. 5 is an enlarged view of the lower part of FIG. 3.

With reference to FIG. 4, the input shaft 11 protrudes through the transmission casing at the input side 27, and comprises a male spline 41 for driving connection with the female spline of a driven plate (not shown) of friction clutch;

this arrangement is conventional. Rolling element bearings 42, 43 support the input shaft for rotation in the casing 20.

Provided on the shaft for rotation therewith are five gear wheels 44-48. Gear wheels 44-47 are respectively associated with forward speeds 2, 1, 4 and 3. As illustrated gear wheel 44 is solid with shaft 11, whereas gear wheels 45-48 slide onto shaft 11 via splines or key ways and are secured in any suitable manner, for example by circlips or the like. Gear wheels 44-48 are connected for rotation with the input shaft at all times.

The low speed layshaft 12 is also supported in the casing 20 by rolling element bearings 52, 53 at the ends thereof, and includes the mating gears 54-57 for forward speed ratios 2, 1, 4, 3.

Gear wheels 54, 55 and 57 are each double gears, and consist of side by side gears of different diameter connected for rotation in common. Thus gear wheel 54 has associated gear wheel 58; gear wheel 55 has associate gear wheel 59; and gear wheel 57 has associated gear wheel 60. Each double gear may be integrally manufactured from a single blank, or may be an assembly.

Each of the gear wheels 54-57 is freely rotatable in the low speed layshaft 12, but connectable for rotation herewith by a respective double acting synchromesh selector 21, 22. As is well understood, the synchromesh system provides a speed synchronizer and dog clutch for coupling one gear wheel at a time to the respective shaft by right or left movement (as viewed) from an unconnected central position. The selectors 21, 22 are positioned respectively between gear wheels 54 and 55 and between gear wheels 56 and 57. Although close together, gear wheels 48 and 60 are not in mesh.

The higher speed layshaft 13 is supported in the casing 20 by rolling element bearings 62, 63 and has independently rotatable gear wheels 64, 65 engaged respectively with gear wheels 46 and 48 of the input shaft 11. Gear pairs 46, 64 and 48, 65 respectively provide forward speed ratios 6 and 5, and a synchromesh selector 23 is provided to connect one or other gear pair for rotation with the layshaft 13 on demand.

Both the low speed layshaft 12 and high speed layshaft 13 include output gear wheels 66, 67 coupled for respective rotation herewith, and which engage with a final drive gear wheel 69 of the output shaft 15.

The reverse layshaft 14 is supported in the casing by rolling element bearings 72, 73. The reverse layshaft 14 also includes an output gear wheel 68 fast therewith and engaged for rotation with the final drive gear wheel 69.

A rotatable sleeve or muff 74 is provided on the reverse layshaft, and is directly connected by transfer gear wheel pair 75, 76 to the low speed layshaft 12, as illustrated. This transfer pair is at the input side 27, whereas the output gears are at the output side 28 (FIG. 3).

The muff 74 is coaxial with the axis of the reverse layshaft 14 and supports gear wheels 77, 78 for rotation thereon. These gear wheels 77, 78 are respectively in mesh with gear wheels 58, 59 of the low speed layshaft 12. A double acting synchromesh selector 24 connects the gear wheels 77, 78 for rotation with the muff 74 on demand.

The innermost gear wheel 78 is also connectable via one side of synchromesh selector 25 to the reverse layshaft 14. Rolling element bearings 79, 81 are provided for the muff 74 as illustrated.

The other side of the selector 25 is operable to couple a freely rotatable gear wheel 80 of the reverse layshaft 14 to gear wheel 60 of the low speed layshaft 12.

The output shaft axis 35 defines the rotational axis of the final drive gear wheel 69. In the illustrated embodiment the gear wheel 69 is connected to the casing 91 of a conventional differential gear 90 having oppositely directed outputs represented by arrows 92, 93.

In use, suitable drive shafts engaged within the differential gear provide drive to respective forward and rearward vehicle axles, via respective axle mounted differential gears (not shown). Such an arrangement is conventional.

In the illustrated embodiment, the forward output 92 is connected to a sprocket 94 which drives another sprocket 95 on the secondary output axis 36 of the secondary output shaft 16 (FIG. 1).

The sprocket 95 is supported in the casing by rolling element bearings 97, 98.

FIG. 2 also illustrates suitable universal drive joints 101, 102 for coupling the final drive outputs to propeller shafts 103, 104 associated respectively with front and rear drive axles of a vehicle.

In the event that only rear wheel drive is required, the differential 90 may be omitted along with the components associated with the front drive output 93; the final drive gear 69 is coupled directly to a suitable output shaft for connection to the universal joint 102.

In the event that only front wheel drive is required, the differential 90 may be omitted along with components associated with the rear drive output 92; the final drive gear 69 is coupled directly to sprocket 94 in any suitable manner, or may directly drive to the universal joint 101 on the same axis.

The transmission of FIGS. 1-5 provides the following internal speed ratios. In the following description all selectors 21-25 are assumed to be in the mid-position (not driving) unless stated otherwise; in this condition the transmission is in neutral.

Six sequential forward speed ratios are provided, as follows:—

$1^{st}$

Selector 21 moved rightward. Drive via input shaft 11; gear pair 45, 55; layshaft 12; output gears 67, 69.

$2^{nd}$

Selector 21 moved leftward. Drive via input shaft 11; gear pair 44, 54; layshaft 12; output gears 67, 69.

$3^{rd}$

Selector 22 moved rightward. Drive via input shaft 11, gear pair 47, 57; layshaft 12; output gears 67, 69.

$4^{th}$

Selector 22 moved leftward. Drive via input shaft 11; gear pair 46, 56; layshaft 12; output gears 67, 69.

$5^{th}$

Selector 23 moved rightward. Drive via input shaft 11; gear pair 48, 65; layshaft 13; output gears 66, 69.

$6^{th}$

Selector 23 moved leftward. Drive via input shaft 11; gear pair 46, 64; layshaft 13; output gears 66, 69.

It will be understood that individual ratios may be adjusted by changing the diameter of a respective gear pair, save that $4^{th}$ and $6^{th}$ use a common drive gear 46 and are thus inter-dependent. The relative position of axes 31-33 permits further adjustment or gear wheel diameter, and thus ratio.

In one embodiment, the following ratios are provided:
$1^{st}$—17.74 $2^{nd}$—10.82 $3^{rd}$—7.13 $4^{th}$—5.08 $5^{th}$—3.75 $6^{th}$—2.78

Two extra low ratios are provided as follows:—

L1 Selector 24 moved rightward. Drive via input shaft 11; gear pairs 45, 55 and 59, 78; muff 74; gear pair 75, 76; layshaft 12; output gears 67, 69.

L2 Selector 24 moved leftward. Drive via input shaft 11, gear pairs 44, 54; 58, 77; muff 74; gear pair 75, 76; layshaft 12; output gears 67, 69.

The extra low ratios may be adjusted by changing the diameter of the respective gear pair 45, 59 and 44, 58, and by altering the relative position of reverse shaft axis 34. In this embodiment the gear wheels on the low speed layshaft are idlers.

In one embodiment, the following further sequential low ratios are provided:

L1—43.83 L2—27.19

Thus eight sequential forward speed ratios are provided. It should be noted that movement of the selectors 21-24 is compatible with a conventional shift pattern of the multiple 'H' type—thus movement of a gear lever in one direction corresponds to leftward selector movement (L2, $2^{nd}$, $4^{th}$, $6^{th}$) whereas movement in the opposite direction corresponds to rightward selector movement (L1, $1^{st}$, $3^{rd}$, $5^{th}$).

A generally conventional reverse ratio is provided by shifting selector 25 rightwards. Drive is via input shaft 11; gear train 47, 60, 80; reverse layshaft 14; output gears 68, 69. The additional gear in the train reverses rotation of the drive.

A low reverse ratio is provided by shifting selector 25 leftwards. Drive is via input shaft 11; gear train 45, 59, 78; reverse layshaft 14; output gears 68, 69.

In one embodiment, the following sequential reverse ratios are provided:

R1—35.79 R2—17.6

The ratio of R2 is substantially the same as $1^{st}$, and thus corresponds to the feel of a conventional manual transmission. This ratio may be adjusted by varying the relative size of gear wheels 60 and 80.

The ratio of R1 may be varied by selecting appropriate diameters of gear wheels 59 and 78.

Figure 6:
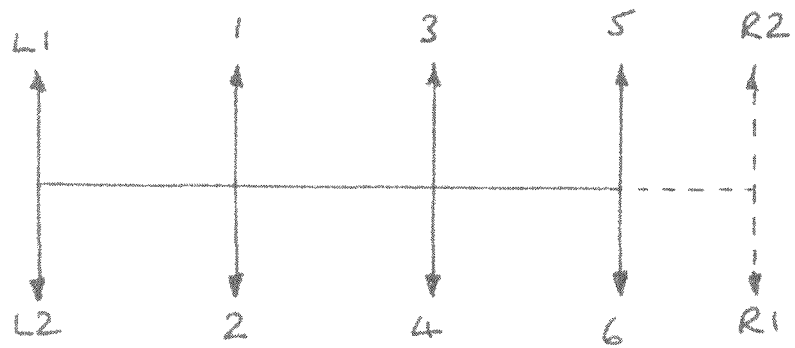
FIG. 6 illustrates an example gear shift pattern for a manual variant of the transmission of FIG. 2.

The reverse ratios require opposite movement of the selector 25, and are thus compatible with manual shift pattern of the 'H' type. In R2 ratio the gear wheel on the low speed layshaft is an idler. A suitable shift pattern is illustrated in FIG. 6. Reverse may be provided in any suitable plane, and is illustrated to the right of 5-6; it could alternatively be to the left of L1-L2.

The transmission thus provides eight forward and two reverse ratios with an acceptable spread of forward ratios, with steps in the range 60-75%.

It will be understood that a feature of this transmission is that the three layshafts 12-14 in driving connection with the output shaft 15 at all times. Thus drive via any of the three layshafts results in the other two layshafts being back driven. The ratios selected in the described embodiment ensure that the speed of individual gear wheels remains within acceptable design limits for conventional engine speeds, for example below 7000 rpm.

Whilst the transmission of this invention can provide eight forward and two reverse speeds, it need not do so. For example if specified for road use only, a single reverse ratio (R2) may be sufficient, whereas for off-road use both R1 and R2 may be provided. R1 may be omitted by deleting gear wheels 59 and 78, and making the selector 25 single acting.

In the same way L1, or L1 and L2 may be omitted for a road use only application. L1 is omitted by deleting gear wheels 59 and 78 (assuming R1 is omitted and L2 retained).

L2 is omitted by deleting gear wheels 58 and 77. Since L1 is almost certainly not required if L2 is omitted, gear wheels 59, 78 and 75, 76 may also be deleted. In this configuration R1 is almost certainly not required, which results in deletion of the muff 74 along with selector 24.

It will of course be understood that a different naming of speed ratios might follow from deletion of $5^{th}$ and $6^{th}$ (as described above) whilst retaining L1 and L2. Thus the sequential range L1, L2, 1, 2, 3, 4 might be termed $1^{st}$ to $6^{th}$. In this configuration the high speed layshaft 13 and its associated selector 23, gear pairs 46, 64 and 48, 65, and output gear 66 could be deleted.

Likewise a sequential 6 speed transmission could comprise L2, 1, 2, 3, 4, 5 and a seven speed transmission could comprise L1, L2, 1, 2, 3, 4, 5 or L2, 1, 2, 3, 4, 5, 6. Whilst not all of these combinations may at first sight be considered useful, they are all practicable in the event that packaging constraints will not allow fitting of the eight speed transmission casing envisaged. Thus omission of one or more forward and reverse ratios will permit the casing to more closely follow the remaining envelope of gear wheels and permit a casing of lesser overall size.

A notable feature of the invention is that the output shaft is not aligned with the input shaft (see FIG. 1). Thus the relatively high level input axis 31 associated with a conventional internal combustion engine (by virtue of crankshaft swing) is accompanied by relatively low level output axes 35, 36, which may be useful in eliminating intrusion into the passenger accommodation whilst giving propeller shafts which operate through a lesser angle. The arrangement also permits one propeller shaft to pass the engine more easily.

Yet another feature is integration of the centre differential 26 within the transmission casing at the relatively low level output axes 35, 36. Integration ensures that tolerance build-up, which necessarily results from a separate differential in a separate casing, is avoided.

Figure 7:
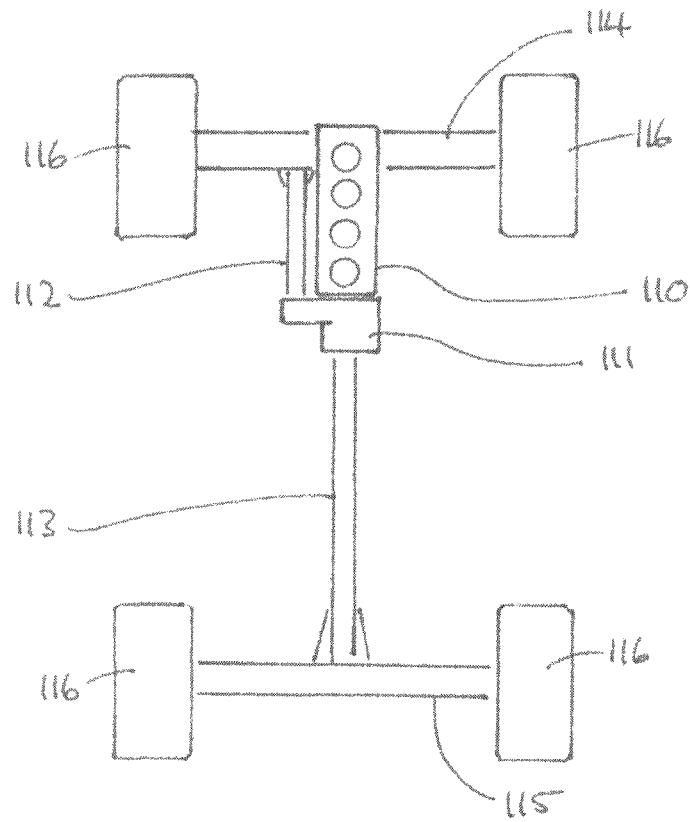
FIG. 7 is a schematic illustration of a north/south installation of a transmission according to an embodiment of the invention in a four wheel drive vehicle.

FIG. 7 shows an in-line engine configuration 110 with attached transmission 111, front and rear propeller shafts 112, 113, front and rear axles 114, 115, and wheels 116.

The invention claimed is:

1. A constant mesh gearbox having a plurality of individually selectable forward speed ratios, and comprising a casing defining an array of parallel rotational axes, said axes including an input axis, an output axis and a plurality of intermediate axes, and gear pairs for driving between members rotatable on the input axis, the output axis and said intermediate axes, wherein a first shaft is rotatable on one of said intermediate axes, a second shaft is rotatable on another of said intermediate axes, said first and second shafts are directly connected by a first gear wheel pair, a sleeve is rotatable on said second shaft, and said sleeve and said first shaft are directly connected by a second gear wheel pair, and
    wherein said sleeve supports a first gear wheel for rotation thereon, said first gear wheel being selectively connectable for rotation with said sleeve, and being in driving engagement with an input shaft on said input axis.

2. A constant mesh gearbox according to claim 1, wherein said first gear wheel is in constant driving engagement with said input shaft via a first idler gear wheel rotatable on said first shaft.

3. A constant mesh gearbox according to claim 2, wherein said first idler gear wheel comprises a double gear having side by side gear profiles of different diameter, one of said profiles comprising an input and the other of said profiles comprising an output.

4. A constant mesh gearbox according to claim 3, wherein said first idler gear wheel is selectively connectable for rotation with said first shaft.

5. A constant mesh gearbox according to claim 1, wherein said sleeve supports a second gear wheel for rotation thereon, said second gear wheel being connectable for rotation with said sleeve, and being in driving engagement with said input shaft.

6. A constant mesh gearbox according to claim 5, wherein said second gear wheel is in constant driving engagement with said input shaft via a second idler gear wheel rotatable on said first shaft.

7. A constant mesh gearbox according to claim 6, wherein said second idler gear wheel comprises a double gear having side by side gear profiles of different diameter, one of said profiles comprising an input, and the other of said profiles comprising an output.

8. A constant mesh gearbox according to claim 7, wherein said second idler gear wheel is selectively connectable for rotation with said first shaft.

9. A constant mesh gearbox according to claim 8, wherein said first and second idler gear wheels are alternately connectable to said first shaft via a double acting synchromesh coupler.

10. A constant mesh gearbox according to claim 5, wherein said first and second gear wheels are alternatively connectable to said sleeve via a double acting synchromesh coupler.

11. A constant mesh gearbox according to claim 5, wherein said second gear wheel is connectable to said second shaft via a synchromesh coupler.

12. A constant mesh gearbox according to claim 1, wherein said sleeve is supported by rolling element bearings adjacent the ends thereof, one of said bearings engaging said casing and the other of said bearings engaging said second shaft.

13. A constant mesh gearbox according to claim 12, wherein the other of said bearings is disposed between said second shaft and said second gear wheel, said second gear wheel being journalled on said sleeve.

14. A vehicle powertrain incorporating a constant mesh gearbox according to claim 1.

15. A vehicle comprising a constant mesh gearbox according to claim 1.

* * * * *

UNITED STATES PATENT AND TRADEMARK OFFICE
CERTIFICATE OF CORRECTION

| | | |
|---|---|---|
| PATENT NO. | : 9,752,655 B2 | Page 1 of 1 |
| APPLICATION NO. | : 14/787823 | |
| DATED | : September 5, 2017 | |
| INVENTOR(S) | : Osborn et al. | |

It is certified that error appears in the above-identified patent and that said Letters Patent is hereby corrected as shown below:

In the Claims

In Claim 9, Column 9, Line 17; replace "said first and second idler gear wheels" with --a first idler gear wheel and said second idler gear wheel--

Signed and Sealed this
Nineteenth Day of July, 2022

Katherine Kelly Vidal
*Director of the United States Patent and Trademark Office*